3,404,793
LOAD CARRIER
Albert A. Pinkert, 8541 S. Cregier,
Chicago, Ill. 60617
Filed June 7, 1966, Ser. No. 555,829
3 Claims. (Cl. 214—152)

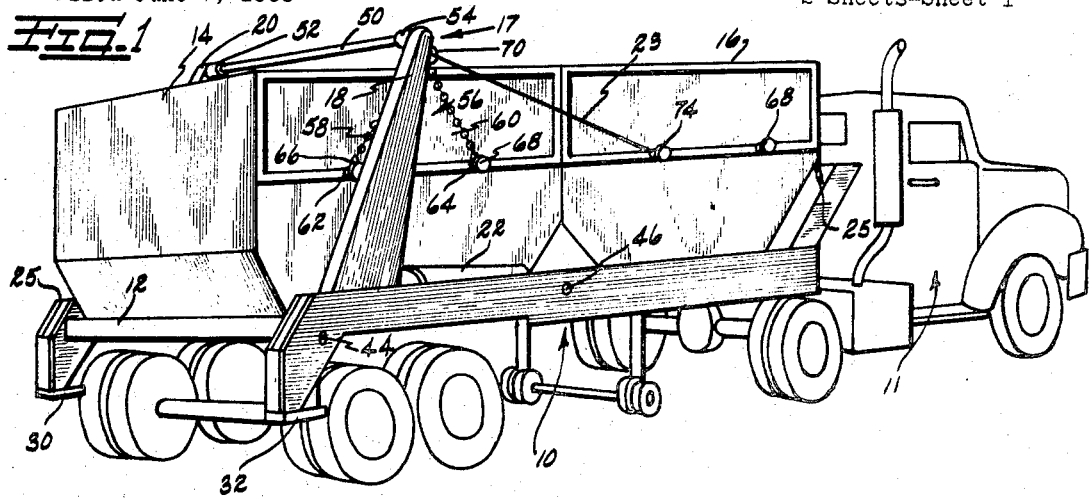
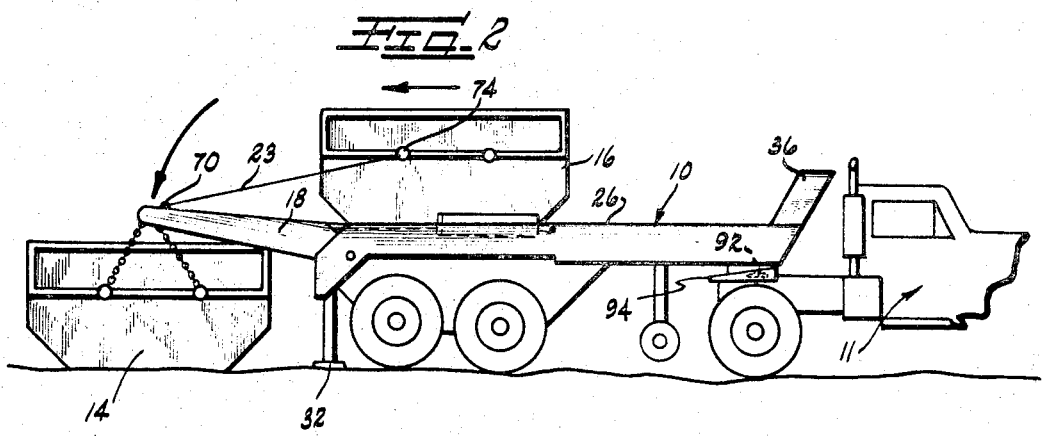
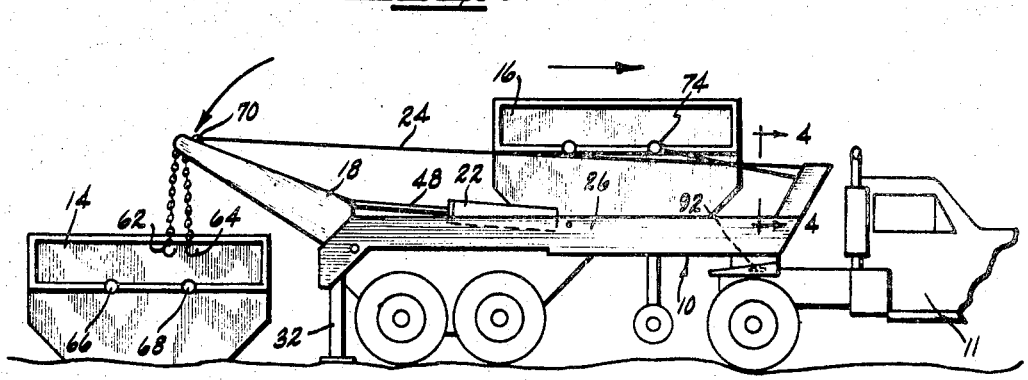

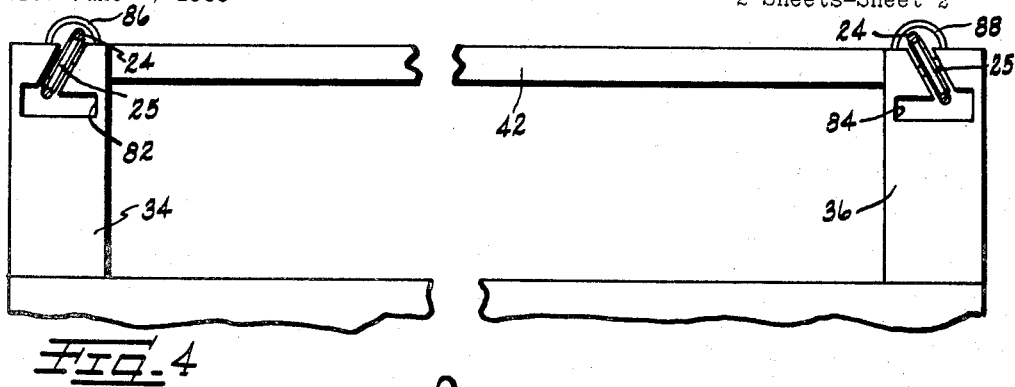
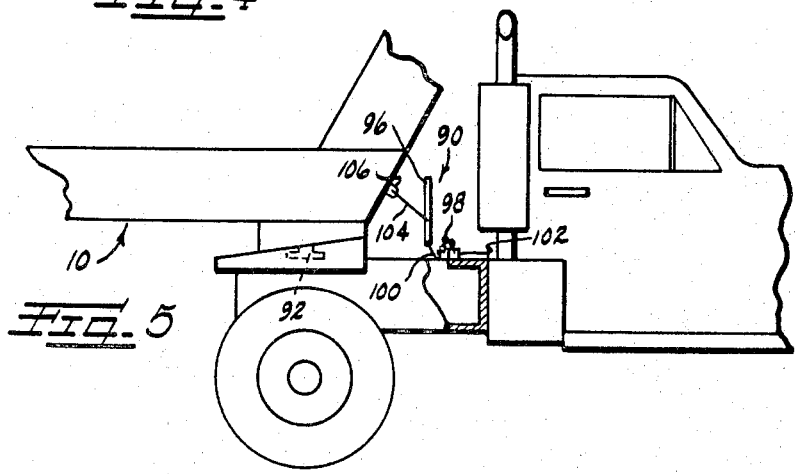
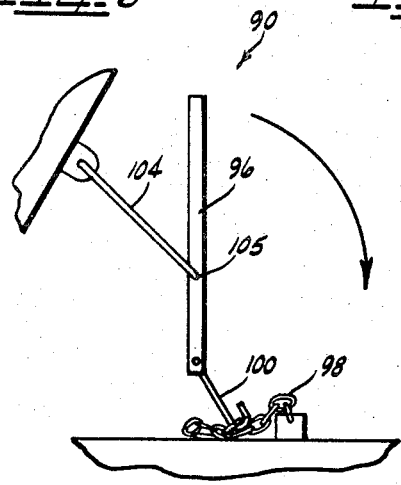
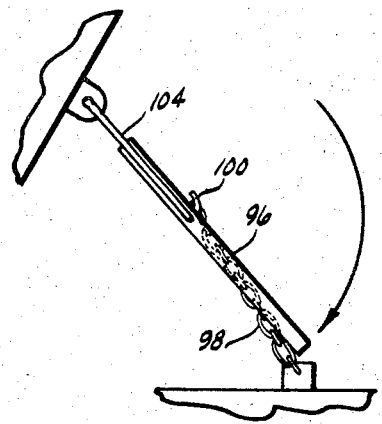
Inventor
ALBERT A. PINKERT

ABSTRACT OF THE DISCLOSURE

The loading and unloading of a pair of cargo carrying containers from adjacent the forward and rearward ends respectively of an elongated truck bed having a pair of arms pivotally mounted thereon. The arms are employed both to transfer containers between the rearward end of the bed and a remote location and to move containers between the front and rear of the bed.

---

The present invention relates generally to the handling of cargo containers and, more particularly, to methods and apparatus for loading a pair of cargo containers onto and unloading them from a load transporting vehicle.

In certain industries it is necessary that provision be made for collecting waste materials, such as scrap metal and the like. Often such industrial waste has substantial value and it may therefore be economically collected in large open topped steel containers for transport to a suitable reclaiming facility. In the case of scrap metal, for example, containers are provided which are adapted to carry several tons of material. Such containers are frequently filled at the site of the plant or other facility where the scrap becomes available and are loaded onto and transported by truck to a scrap yard or other processor. At the scrap yard, the containers are unloaded from the truck and emptied.

Truck mounted cargo carrying units which may be loaded and unloaded from the bed of a truck by suitable equipment carried on the truck have been available for some time but are somewhat limited in usefulness. For example, such a unit as is shown in U.S. Letters Patent No. 3,074,573 is capable of transporting only a single cargo carrying container at a time. Accordingly, not only is the capacity of the truck limited but, in addition, only a single scrap-producing facility can be serviced by the truck on any given trip.

To avoid this inefficiency, units of this type have been provided which include a cargo carrying container of appreciably greater size. However, such containers are rather cumbersome and difficult to handle and, more importantly, are in appropriate for use in many instances due to their large size. In this regard, a large capacity container often is not suitable for use in operations other than those where extremely large volumes of scrap, which are to comprise its cargo, are to be handled. Such lack of versatility, accordingly, makes such a unit somewhat inefficient in operation also.

Accordingly, it is an object of the present invention to provide an improved method and apparatus for handling cargo carrying containers.

Another object of the invention is to provide a novel method and apparatus for handling materials of the type conveniently carried in open topped containers in which a pair of such containers are simultaneously carried on the bed of a single vehicle.

It is a further object of the invention to provide an improved method and apparatus for loading a pair of cargo carrying containers onto a truck bed and for unloading such containers therefrom.

Other objects and advantages will become readily apparent from the following detailed description and accompanying drawings wherein:

FIGURE 1 is a perspective view of a tractor and trailer carrying a pair of containers and showing various of the features of the present invention;

FIGURE 2 is a side elevational view of the tractor and trailer of FIGURE 1, illustrating a step in the unloading of the containers from the trailer;

FIGURE 3 is a side elevational view similar to that of FIGURE 2, but illustrating a step in the loading of the containers onto the trailer;

FIGURE 4 is a fragmentary sectional view taken generally along line 4—4 of FIGURE 3;

FIGURE 5 is an enlarged, fragmentary side elevational view of the tractor and trailer of FIGURE 1 showing certain other features of the invention;

FIGURE 6 is an enlarged, fragmentary view of a portion of the apparatus shown in FIGURE 5; and FIGURE 7 is an enlarged, fragmentary view similar to that of FIGURE 6, but illustrating the portion of the apparatus in another position.

Referring generally to the drawings, there is shown therein a trailer 10 which is coupled to and driven by a tractor 11. Although an apparatus in accordance with the principles of the present invention may be readily utilized in conjunction with various types of flat bed trucks or other such hauling devices, it has been found to be particularly advantageous for use in conjunction with a trailer, having a flat bed and driven by a tractor and accordingly is described in terms thereof. The trailer 10 is provided with a suitable frame 12 secured to its chassis and defining a bed adapted to supportingly receive a pair of open-topped containers 14 and 16 arranged on the bed in longitudinal alignment. A container handling device 17 is provided adjacent the rear end of the bed for transferring the containers between the rear end of the trailer bed and a location remote from the trailer bed. This device includes a pair of arms 18 and 20, one of which is pivotally mounted on the frame 12 at each side thereof for rocking movement about an axis passing through its lower end. Each arm is rocked by a hydraulic cylinder 22, carried adjacent the sides of the frame slightly forwardly of the arms.

In the loading and unloading of the containers, the arms can be easily connected to a container supported adjacent the rear of the trailer bed so that, when the arms are rocked, such a container will be lifted onto or off of the bed. However, the location of the arms and their length and range of movement is such that the conventional manner of coupling them to a container does not make it feasible to move a container directly between a position adjacent the front of the trailer bed and a location remote from the bed. Accordingly, for unloading a container positioned adjacent the front of the bed, the arms are detachably coupled to the forwardmost container by means of cables 23 so as to effect rearward movement of the forwardmost container as the rearwardmost container is being deposited in a position remote from the trailer 10 (FIG. 2). During the loading operation, a container disposed on the rear of the truck bed is coupled to the arms by means of cables 24 which pass around reversing pulleys 25 located at the front of the bed so that as the arms are moved toward the rear into position to be coupled to a container located remotely from the trailer bed, the container already on the bed is moved forwardly, thereby providing a space on the bed wherein the second container can be accommodated.

More specifically, the frame 12 includes upstanding guide rails 26 and 28 extending along its opposed longitudinal sides, which serve to aid in positioning the containers 14 and 16 as well as to support the arms 18 and 20 and the hydraulic cylinders 22. A pair of retractable jacks 30 and 32 are carried at the rear of the frame and, when extended, aid in maintaining the stability of the unit, particularly when heavy loads are being handled. A pair of upwardly depending, forwardly inclined posts or pedestals 34 and 36 are secured adjacent the forward ends of the rails at the front edge of the frame 12, as by welding or the like. These pedestals serve to support the reversing pulleys 25 adjacent their upper ends (see FIGURE 4), and by virtue of their forward inclination permit the pulleys 25 to be located at a position forward of the front edge of the frame 12 so that the cables 24 can effect positioning of a container adjacent the front of the trailer bed, during loading. Preferably, a cross member 42, such as a steel bar, extends between the inwardly facing surfaces of the pedestals adjacent their upper ends so as to provide increased structural rigidity for the pedestals and the pulleys, as well as to serve as an abutment for the forwardmost container on the trailer bed.

The arms 18 and 20 are pivotally mounted on the side rails 26 and 28 and extend upwardly from a pivot point generally designated by the numeral 44. The arms are of a length somewhat greater than the height of the containers so as to be adapted to be conveniently coupled to the container, as subsequently described. The particular mode of connection of the arms to the side rails does not enter into the present invention and is described in detail in other available literature (see, for example, U.S. Patent No. 3,074,573).

The arms 18 and 20 are generally arranged to be rocked about the pivot point 44 in response to actuation by the hydraulic cylinders 22, one cylinder being provided for each of the arms. The cylinders are pivotally connected to the respective side rails forwardly of the arms at a pivot point indicated by the numeral 46. Connection between the cylinders 22 and the arms 18 and 20 is effected through a connecting rod 48 carried by each of the cylinders and directed both inwardly and outwardly by hydraulic pressure established within the cylinder. Accordingly, it may be seen that actuation of the cylinders effects rocking movement of the arms 18 and 20 about the pivot point 44. It is understood, of course, that the cylinders 22 are actuated simultaneously so that the arms will rock in unison.

In order to provide a support for effecting coupling between the arms 18 and 20 and the respective containers 14 and 16 during the loading and unloading thereof, it is desirable to provide a cross member 50 which extends between the arms. The cross member 50 connects the upper ends of the arms and thus is spaced upwardly from the open upper ends of the containers. The cross member 50 preferably is carried by stub shafts 52 and 54 journaled within suitable openings (not shown) in the upper ends of the arms.

Coupling between a container 14 or 16 and the member 50 is effected by the provision of a flexible support means 56, which preferably comprises a pair of strands 58 and 60 of heavy duty link chain suitably mounted on each of the stub shafts 52 and 54. The chains 58 and 60 are arranged to be of an appropriate length so as to extend downwardly a predetermined distance such that their lower ends may be coupled to the containers, as subsequently described. The strands in each pair of chains are secured at one end of the stub shaft adjacent the respective arm and suitably maintained in position, such as by the provision of a U bolt (not shown) secured about the respective stub shaft and maintained in position by a cross bar (not shown). The U bolt and the cross bar are thus fixedly secured to the respective stub shafts so as to prevent slippage of the chains off of the stub shaft. Thus, the upper end of each of the chains is maintained in position intermediate the arm and the end of the respective stub shaft projecting outwardly from the arm.

The chains are selected to be of a length such that they extend downwardly from the point adjacent the upper end of the arms to which they are attached to a location which is approximately at the midpoint of the particular container disposed at the rear portion of the trailer 10. In addition, the downwardly projecting ends of the chains each have affixed thereto an eye plate 62 and 64 respectively, each of which is provided with a suitable aperture of sufficient size to loosely receive posts or ears 66 and 68 which are secured at suitable horizontally spaced locations on the opposed sides of each of the containers and project outwardly therefrom a slight distance.

The posts 66 and 68 are received within the eye plates 62 and 64, when a container is to be lifted onto or removed from the flat bed of the trailer 10. As shown in FIGURES 1 and 2, the strands of chains 58 and 60 are coupled to the posts of the container 14 and, upon actuation of the cylinders, support the container as the arms are rocked to effect lifting of the container and removal thereof from the bed of the trailer to a position remote from the trailer. As shown in FIGURE 3, the arms are rocked rearwardly of the trailer so as to position the eye plates 62 and 64 adjacent the posts 66 and 68 on the container 14 positioned on the ground beind the truck. After the eye plates have been secured to the posts, rocking movement of the arms in a forward direction is effective to lift and supportingly carry the container onto the rear of the trailer.

Each of the arms 18 and 20 further carries an open bracket or loop 70 adjacent its upper end to which an end of a cable 23 or 24 can be attached. The cables are provided with suitable hooks or other fasteners at one end to engage the loops 70, and are provided at their opposite ends with an eye plate 74, similar to the eye plates 62 and 64, for attachment to a post 66 or 68 of a container. During the unloading of the containers, the strand of cable 23 is coupled to the post 66 of the container 16 positioned adjacent the forward end of the truck bed by the eye plate 74 and, upon rocking movement of the arms in a rearward direction, effects dragging or sliding movement of the container 16 toward the rear of the trailer (FIG. 2) as the container 14, positioned on the rear of the trailer bed, is lifted off the trailer onto the ground behind the trailer. Thus, one movement of the arms 18 in a rearward direction results in the simultaneous unloading of one container and the movement of a second container into an unloading position.

After the container 14 has been placed on the ground, the chains 58 and 60 are detached from that container and it is removed by auxiliary equipment such as a crane or tractor. The arms are then rocked upwardly into their previous position so that the eye plates on the ends of the chains may be coupled to the posts 66 and 68 of the container 16. When the arms are again rocked rearwardly, the container 16 is lifted from the trailer bed and also deposited in a position remote from the trailer. Thus, it may be seen that extremely efficient unloading of the containers is effected, since one movement of the arms, i.e., the rocking movement toward the rear, which effects the unloading of the rear container, also effects positioning of the front container 16 such that it may be similarly carried by the arms and removed, or unloaded, from the trailer.

In order to effect loading of the containers 14 and 16 onto the bed of the trailer, the container 16, which is to be eventually located adjacent the front of the trailer, is initially loaded onto the rear of the trailer in the conventional manner, i.e., the eye plates 62 and 64 on the ends of the chains 58 and 60 are coupled to the posts 66 and 68 and the arms are rocked toward the front of the trailer in order to effect lifting, or loading of this container onto the rear of the trailer. When the arms have completed the lifting and deposition of the container 16 into position adjacent the rear of the trailer, the arms are in approximately their rearwardmost position, i.e., the position shown in FIGURE 1. Accordingly, it is highly advantageous to arrange the arms to move the container 16 toward the front of the trailer, which is its final position, as the arms are being rocked rearwardly into position to supportingly receive the rear container 14.

In order to effect forward movement of the container 16 in response to the rearward movement of the arms, the cable 24, which is of a suitable length and is provided with suitable fastening means at each end similar to the cable 23, is secured at one of its ends to the post 68 on each side of the front container 16. Each cable is then threaded over the respective reversing pulleys 25 supported at the upper ends of the pedestals 34 and 36 and is detachably secured at its opposite end to the loop 70 of one of the arms 18.

It may thus be seen from FIGURE 3 that, as the arms 18 and 20 are rockably moved rearwardly, the cable 24 effects movement of the front container 16 toward the front of the trailer. In addition, the cable 24 is arranged to be of such a length that when the arms 18 and 20 are positioned to supportingly receive the rear container 14 through the chains 58 and 60, the container 16 has reached its desired position adjacent the front of the trailer. The cable 24 may then be detached from the arms and from the posts and the arms are then rocked upwardly to deposit the rear container 14 in its proper position adjacent the rear of the trailer to complete the loading operation.

It should be readily apparent from the foregoing description that an extremely efficient loading operation is thus possible. The rearward rocking motion of the arms to position the arms for coupling to the container 14 also effects forward movement of the container 16 into a forwardmost position, thereby providing space on the bed of the trailer to accommodate the rear container 14.

Referring to FIGURE 4, the reversing pulleys 25 are positioned adjacent the upper ends of the pedestals 34 and 36 respectively. The pedestals are each provided with suitable slots 82 and 84 respectively which are adapted to receive the pulleys with the cables threaded thereover. The pulleys are journaled on suitable stub shafts (not shown) which extend across a portion of the slotted opening in each of the pedestals and are preferably mounted on a slant so as to be inwardly and upwardly inclined. This slanted mounting is desirable in the illustrated embodiment, since it aids in preventing the respective portions of the cable 24 from contacting each other as the cable is moved about the rim of the pulley, thereby preventing excessive wear on the cables. In order to provide assurance of the engagement between the rim of the respective pulleys and the cables, a cable guide 86 and 88 is provided across the open upper ends of the slots 82 and 84. The guides are primarily to prevent the cable from being disengaged from the rim of the pulley during movement of the cable about the pulley. Also, as may be seen in FIGURE 4, the lowermost portion of each of the slots 82 and 84 is relatively large in size so as to provide easy accessibility to the pulleys and cable threaded thereabout when it is desired to service these portions of the mechanism.

Substantial advantages are realized in the illustrated embodiment by utilizing a tractor drawn trailer for supporting and transporting the containers. Not only is such a device more maneuverable and often safer to employ under hazardous driving conditions such as wet pavements and the like, but municipalities permit the hauling of substantially heavier loads on a trailer than are permitted, when a truck is utilized for the hauling operation.

Another advantage of the illustrated apparatus resides in an improved coupling between the tractor and the trailer, described in detail hereinafter. In certain instances, when heavy loads are being handled by an apparatus, such as that described herein, difficulties may arise in the loading and unloading of the containers due to the relatively large weight of the cargo being carried by the container, which might tend to cause lifting of the front end of the trailer. Compensation is ordinarily provided by the use of the jacks 30 and 32, which resist rocking of the trailer about its axles. In those instances in which one of the containers is supported on the trailer while the other container is being loaded or unloaded, there is little likelihood of any difficulty arising with respect to lifting forces being applied to the trailer, since the one container already carried on the trailer tends to counterbalance the load being carried by the arms coupled to the other container.

On the other hand, when one of the containers is in a remote location and the other container is being loaded or unloaded, while carrying a relatively heavy cargo, the lever arm extending from the jacks to the axles of the trailer may be insufficient to counterbalance the load being carried at the rear of the trailer and the jacks may become a fulcrum so that a lifting force is applied at the front of the trailer and, consequently, at the rear wheels of the tractor. This may cause substantial stress to be applied to the tractor trailer coupling, which is undesirable.

In certain operations it may be desirable, during the loading or unloading of a container, which carries a relatively heavy cargo, to initially effect lifting of the container a small distance off of the ground and to then transport the container together with the tractor and trailer into a desired location prior to completing the loading or unloading. For example, the container may be stored in an enclosure, which is insufficient in size to accommodate the entire trailer. In such instances the arms may be rocked toward the rear of the trailer followed by suitable manipulation of the trailer to position the arms adjacent the container so that the arms may be coupled to the containers to effect lifting thereof. The container may be slightly lifted so as to be clear of the ground and then transported out of the enclosure by movement of the tractor, after which it can be loaded onto the trailer, as previously described. A similar operation may be effected, when it is desired to position a container within such an enclosure during unloading. It should be apparent that during these operations it is undesirable to permit traction at the rear or driving wheels of the trailer to be reduced, particularly when adverse conditions, such as moist pavement, muddy terrain, etc., are present. Accordingly, it is highly advantageous to prevent the presence of lifting forces at the rear wheels of the tractor.

In order to prevent such lifting forces at the front of the trailer a force transferring means 90 (see FIGURES 5–7) is coupled between the tractor and the trailer, such that upon the application of a lifting force at the tractor-trailer coupling, the force is transferred toward the front of the tractor. The front of the tractor is, of course, relatively heavy and thus aids in counterbalancing the load carried by the container. Furthermore, such a force transfer alleviates undue strain at the coupling between the trailer and the tractor.

As shown in FIGURES 2 and 3 and 5 the tractor and trailer are coupled in the conventional manner by means of a pin 92 which extends from the trailer into a suitable slot in the fifth plate 94 of the tractor. This type of coupling is ordinarily sufficient to absorb substantial forces, but in those situations where a large lifting force is applied, as previously mentioned, shearing of the pin may result followed by the uncoupling of the trailer from the tractor. Consequently, the provision of the force transmitting means is highly desirable in certain instances.

The force transmitting means includes a steel rod 96 disposed intermediate the trailer and the tractor. The rod is pivotally coupled to the trailer and to facilitate the coupling is initially somewhat loosely coupled to the tractor by a suitable length of chain 98. However, in its operative condition, the rod is appropriately positioned to place the chain under tension to complete the coupling.

More particularly, referring to FIGURES 5–7, a clevis hook 100 is provided at one end of the rod 96 and extends toward the tractor so that it may be coupled to the length of chain 98. One end of the length of chain 98 is secured, as by welding or the like, to a transverse steel bar 102 which is secured to the chassis of the tractor by bolting or other suitable means. The other end of the chain is coupled to the hook 100. A second clevis hook 104 extends from a point 105 on the rod, spaced from the end coupled to the hook 100, a distance preferably less than one-half the length of the rod. The second hook 104 is connected to a suitable bracket 106 provided on the frame 12 of the trailer 11, thereby coupling the trailer to the rod.

The force transmitting means 90 is shown in its initial position in FIGURE 6, i e., the chain 98 is in a slack state. In order to cause the rod to assume its final position in which the chain 98 is under tension, a rotational force may be manually applied to the free end of the rod 96 in the direction shown by the arrow, causing the rod to be rotated in a direction toward the tractor and to assume the position shown in FIGURES 5 and 7. In this position the connection point 105 on the rod is in a position vertically below the end of the rod connected to the hook 100. Thus, after the rod has been disposed in this final position it will tend to continue to rotate in this direction in response to a force applied at the front of the trailer and consequently at the point 105. However, the free end of the rod abuts against the chain 98, when in its final position and is, thus, precluded from further rotation so that it remains in the final position. As a result of the provision of the force transmitting means undue stress is avoided at the coupling between the pin 92 and the fifth plate 94 and forces resulting from the lifting of a loaded container at the rear of the trailer are also transferred from the driving wheels of the tractor toward its front wheels.

Generally, after completion of the loading or unloading operation, the force transmitting means is uncoupled by detaching the hook 100 from the chain 98, since this device is no longer required after the loading or unloading has been completed.

Thus, a novel method and apparatus has been provided for use in handling and transporting a pair of cargo carrying containers. In addition, a force transmitting device has been described which further adds to the versatility and efficiency of this method and apparatus.

I claim:

1. A method of loading a pair of cargo carrying containers disposed in a remote location adjacent the rear of a truck bed provided with a pair of rockably mounted arms so as to place one of said containers on the rearward portion of the truck bed and the other container forwardly of the one container, which method comprises supportingly linking one of the containers to the arms so that movement of the arms toward the front of the bed effects lifting of the one container into an initial position on the bed adjacent the rear thereof, disconnecting said supporting linkage and detachably coupling the one container to the arms by means of cables threaded onto reversing pulleys located adjacent the front of the bed, and moving the arms toward the rear of the bed to cause movement of the one container toward the front of the bed while simultaneously positioning the arms to supportingly receive the other container.

2. A method in accordance with claim 1 wherein the other container is lifted onto the initial position previously occupied by the one container after the one container has been moved toward the front of the bed.

3. A method of unloading a pair of cargo carrying containers from adjacent the forward and rearward ends respectively of an elongated truck bed having a pair of arms mounted thereon for pivotal movement about a fixed horizontal axis extending transversely of the bed adjacent the rearward end thereof, which method comprises locating the arms in a first position relative to the truck bed, supportingly linking the rearwardmost container to the arms when in the first position so that pivotal movement of the arms rearwardly to a second position effects a lifting of the rearwardmost container off the bed and a depositing thereof onto a remote location adjacent the rearward end of the bed, pivotally moving the arms from the first to the second position, unlinking the arms from the container in the second position, moving the arms forwardly from the second back to the first position, and effecting a connection of the forwardmost container to the arms by means of a cable during one of the forward and rearward movements of the arms in the unloading of the rearwardmost container, said connection being effective to drag the forwardmost container rearwardly along the bed of the truck and place it in a location in which it may be connected to the arms when the arms are in said first position.

References Cited

UNITED STATES PATENTS 3,204,797    9/1965    Chandler            214—518
3,341,038    9/1967    Wicklund         214—77 XR ALBERT J. MAKAY, *Primary Examiner.*